(12) United States Patent
Assmann

(10) Patent No.: US 12,517,232 B2
(45) Date of Patent: Jan. 6, 2026

(54) CROSS-TALK REJECTING CONVOLUTION PEAK FINDING

(71) Applicant: STMicroelectronics International N.V., Geneva (CH)

(72) Inventor: Andreas Assmann, Edinburgh (GB)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 443 days.

(21) Appl. No.: 18/064,412

(22) Filed: Dec. 12, 2022

(65) Prior Publication Data

US 2024/0192337 A1  Jun. 13, 2024

(51) Int. Cl.
*G01S 7/4865* (2020.01)
*G01S 7/481* (2006.01)
*G01S 17/894* (2020.01)

(52) U.S. Cl.
CPC .......... *G01S 7/4865* (2013.01); *G01S 7/4813* (2013.01); *G01S 7/4816* (2013.01); *G01S 17/894* (2020.01)

(58) Field of Classification Search
CPC .... G01S 7/4865; G01S 7/4813; G01S 7/4816; G01S 17/894; G01S 17/10; G01S 7/4802; G01S 7/4804; G01S 7/4876; G06F 18/243; G06F 2218/14
See application file for complete search history.

(56) References Cited

U.S. PATENT DOCUMENTS

| | | | | |
|---|---|---|---|---|
| 2016/0274226 | A1* | 9/2016 | Lewis | G01S 7/4865 |
| 2018/0253404 | A1* | 9/2018 | Moore | G06F 11/0703 |
| 2018/0259645 | A1* | 9/2018 | Shu | G01S 7/4863 |
| 2021/0156976 | A1* | 5/2021 | Beer | G01S 17/10 |

FOREIGN PATENT DOCUMENTS

EP  3370078 A1 *  9/2018  ............. G01S 17/10

* cited by examiner

*Primary Examiner* — Paresh Patel
*Assistant Examiner* — Dilara Sultana
(74) *Attorney, Agent, or Firm* — Slater Matsil, LLP

(57) ABSTRACT

A method of processing a histogram generated by a time-of-flight (ToF) imager includes: filtering the histogram using a zero-crossing filter (ZCF) to generate a ZCF output signal; finding zero-crossing points in the ZCF output signal, where the zero-crossing points define one or more pulse regions in the ZCF output signal; computing, for each pulse region of the one or more pulse regions, a weighted sum of the pulse region; finding, in each pulse region, a maximum peak; classifying the maximum peak in each pulse region as a first type of peak or a second type of peak based on the weighted sum of the pulse region; and generating a list of ZCF targets from the maximum peaks classified as the first type of peaks.

20 Claims, 15 Drawing Sheets

CROSS-TALK REJECTING CONVOLUTION PEAK FINDING

TECHNICAL FIELD

The present invention relates generally to time-of-flight (ToF) imagers, and, in particular embodiments, to ToF imagers with peaking finding circuits for rejecting cross-talk and improving range of detection.

BACKGROUND

Time-of-flight (ToF) imagers (also referred to as ToF sensors) have been widely used recently for various applications, such as gesture/facial recognition, light detection and ranging (LiDAR), virtual reality, augmented reality, and autonomous robotics. To measure an object, the ToF sensor sends a light signal towards the object and measures the time taken by the signal to travel to the object and back.

Single photon avalanche diode (SPAD) may be used as a detector of reflected light. In some applications, an array of SPADs is provided as a sensor (e.g., an SPAD array) in order to detect a reflected light pulse. A reflected photon may generate a carrier in the SPAD through a photo electric effect. The photon-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array. The histogram for each SPAD includes a plurality of histogram bins, where each histogram bin corresponds to a distance (or a narrow range of distance) from the SPAD array, and the value (e.g., signal count) of each histogram bin corresponds to the number of detected avalanche current events (e.g., number of detected photons).

The histogram from the SPAD need to be processed to extract useful information, such as the number of targets detected, the distance of the targets, and so on. Challenges remain in the processing of the histogram. For example, cross-talk may cause a false target to be detected. In addition, these processing is usually computational intensive and is often performed by an off-chip processor that is located in a different semiconductor die from the semiconductor die having the SPAD array. Efficient processing for the histogram of the SPAD is needed to reduce computational complexity and to enable higher-level of integration for ToF imagers.

SUMMARY

In an embodiment, a method of processing a histogram generated by a time-of-flight (ToF) imager includes: filtering the histogram using a zero-crossing filter (ZCF) to generate a ZCF output signal; finding zero-crossing points in the ZCF output signal, where the zero-crossing points define one or more pulse regions in the ZCF output signal; computing, for each pulse region of the one or more pulse regions, a weighted sum of the pulse region; finding, in each pulse region, a maximum peak; classifying the maximum peak in each pulse region as a first type of peak or a second type of peak based on the weighted sum of the pulse region; and generating a list of ZCF targets from the maximum peaks classified as the first type of peaks.

In an embodiment, a method of processing a histogram generated by a time-of-flight (ToF) imager includes: assigning a weight coefficient for each histogram bin of the histogram; generating a ZCF output signal by filtering the histogram using a zero-crossing filter (ZCF); finding positive pulse regions in the ZCF output signal, wherein each of the positive pulse regions is defined by a pair of zero-crossing points; computing, for each positive pulse region, a weighted sum by multiplying values of the ZCF output signal with corresponding weight coefficients of the histogram bins to generate weighted values of the ZCF signal and by adding the weighted values of the ZCF output signal in each positive pulse region; classifying a maximum peak in each positive pulse region as a first type of peak or a second type of peak based on the weighted sum of the positive pulse region; and creating a list of ZCF targets from the maximum peaks classified as the first type of peaks.

In an embodiment, a time-of-flight (ToF) imager includes: a light source configured to generate a light signal for illuminating an object; a single-photon avalanche diode (SPAD) configured to generate a histogram for reflected light signal from the object; a zero-crossing filter (ZCF) configured to generate an ZCF output signal by filtering the histogram; a matched filter (MF) configured to generate an MF output signal by filtering the histogram; and a peak finding circuit configured to identify a list of targets in the histogram using the ZCF output signal and the MF output signal by: finding positive pulse regions in the ZCF output signal, wherein each of the positive pulse regions is defined by a pair of zero-crossing points; computing, for each positive pulse region, a weighted sum of the ZCF output signal in the positive pulse region; classifying a maximum peak in each positive pulse region as a first type of peak or a second type of peak based on the weighted sum of the positive pulse region; generating a list of ZCF targets based on the maximum peaks classified as the first type of peaks; identifying a strongest MF target from the MF output signal; and generating the list of targets in the histogram using the list of ZCF targets and the strongest MF target.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, the same or similar reference symbols generally designate the same or similar component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of ToF imagers (also referred to as ToF sensors), and in particular embodiments, to ToF imagers with peaking finding circuits for rejecting cross-talk and improving range of detection.

Figure 1:
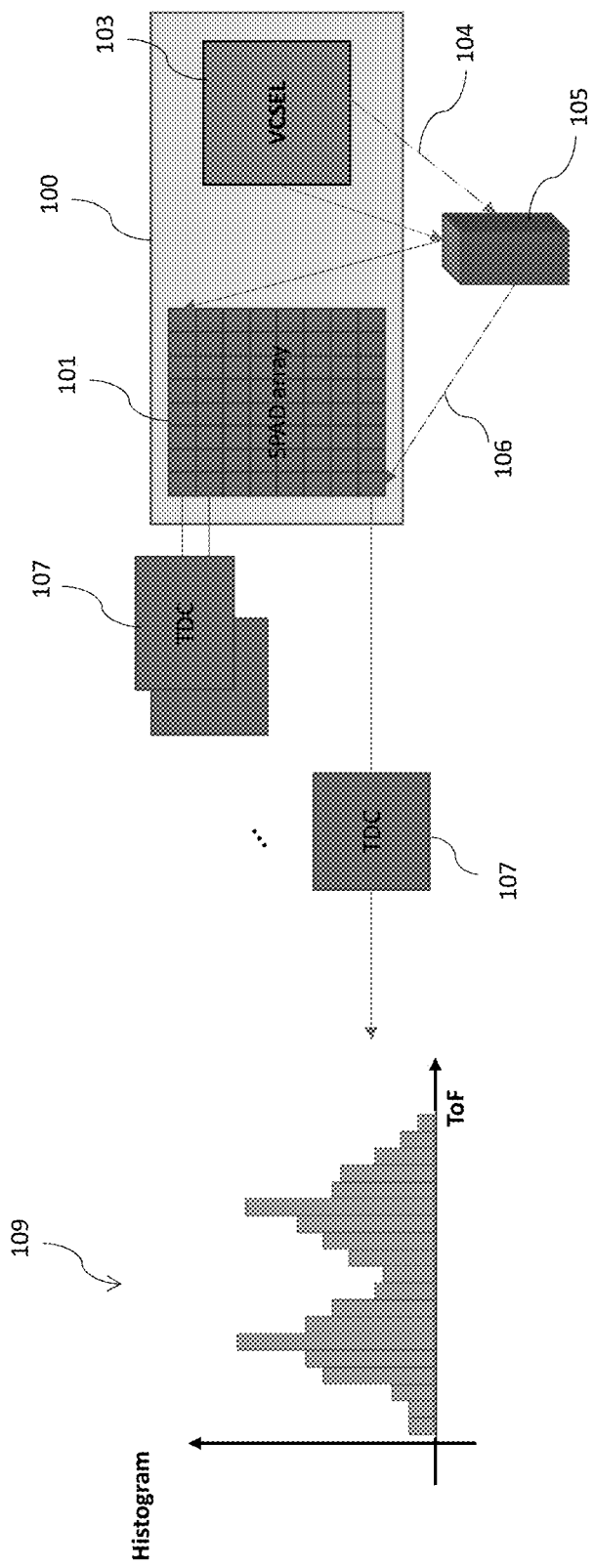
FIG. 1 illustrates a time-of-flight (ToF) imager, in an embodiment.

FIG. 1 illustrates a time-of-flight (ToF) imager 100, in an embodiment. The ToF imagers 100 includes a SPAD array 101 and a light source 103 (also referred to as an emitter 103). The light source 103 is a circuit configured to generate a light signal 104 for illuminating an object 105 (e.g., a target). The light source 103 may be, e.g., a vertical-cavity surface-emitting laser (VCSEL) device, a light-emitting diode (LED), an infra-red (IR) device, or the like. The reflected light signal 106 from the object 105 is received by the SPAD array 101. The SPAD array 101 includes a plurality of SPADs arranged in, e.g., rows and columns. Each of the SPADs in the SPAD array 101 has a respective time-to-digital converter (TDC) 107, which generates a histogram 109 for the received light signal at each of the SPADs. Note that to avoid cluttering in FIG. 1, the TDCs 107 are illustrates as being outside the ToF imager 100, with the understanding that the TDCs 107 are part of the ToF imager 100. The SPAD array 101 is described as comprising a plurality of SPADs as a non-limiting example, the SPAD array 101 may include only a single SPAD.

The histogram from the TDC 107 is processed to extract useful information about the object 105, such as the number of targets, and the distance of the target(s) from the SPAD array. The information extracted from the histograms of the SPADs in the SPAD array may be used to construct, e.g., a 3D depth map. Conventional algorithms for processing the histogram is computationally intensive, and may use multiple iterative algorithm stages and/or multiple software instances to cover corner cases and applications. Due to the high computational complexity, the histograms from the SPAD array is often processed by an off-chip processing module, e.g., a micro-processor or an application-specific integrated circuit (ASIC), that is located in a different integrated circuit (IC) device from the IC device (e.g., the ToF imager) where the SPAD array is located. Such off-chip computation is not only costly (e.g., due to the number of IC devices needed), but also increases input/output (I/O) complexity of the ToF imager, requires large amounts of memory, and incurs time delay for data transfer, due to the large amount of histogram data to be transferred between the ToF imager and the off-chip processing module.

Even if the micro-processor or ASIC for histogram processing is integrated with the SPAD array in the same IC device (e.g., on the same semiconductor die of the ToF imager), the high computational complexity of the conventional histogram processing means high complexity, high power, and large memory requirement for the integrated IC device. For example, many iterations (e.g., for-loops) may be performed by the conventional histogram processing to loop over the number of different histograms, multiple iterative algorithm stages may be needed, and multiple software instances may be used to cover corner cases and applications, which introduce processing latency, limit frame time, and are difficult to maintain.

Another challenge for target detection using the histogram is the effect of cross-talk, as explained herein. The ToF imager 100 is usually enclosed in an assembly housing (e.g., a shell, a box, or the like) for protection against damage and external environment (e.g., dust, rain, or the like). The assembly housing has a window (e.g., a glass window), through which the light signal 104 generated by the light source 103 is sent out and the reflected light signal 106 is received by the SPAD array 101. The window reflects a portion of the transmitted light signal 104 back to the SPAD array 101, this phenomenon is referred to as cross-talk (may also be referred to as cover glass reflection, or housing reflection), and the reflected light signal by the window is referred to as a cross-talk signal. The cross-talk signal is usually recorded in the histogram as a pulse region in the first few bins of the histogram, due to the close distance between the SPAD array 101 and the window of the assembly housing. The cross-talk signal in the histogram, if not processed properly, may be incorrectly detected as a close target.

The present disclosure discloses peak finding circuits and algorithms for efficiently processing the histogram. The peak finding circuits use a matched filter (MF) and a zero-crossing filter (ZCF) to filter the histogram and generate an MF output signal and a ZCF output signal, respectively. The values of the ZCF output signal are then weighted by respective weight coefficients, and a weighted sum is calculated for each positive pulse region in the ZCF output signal. The maximum peak in each positive pulse region in the ZCF output signal may be a potential target. The weighted sum for each positive pulse region is used to reject false target caused by the cross-talk signal. The strongest peak among the remaining (e.g., valid) maximum peaks in the positive pulse regions in the ZCF output signal is chosen as the strongest target of the ZCF output signal. A strongest target in the MF output signal is also identified. Based on a switch-over criteria (details discussed hereinafter), the peak finding circuit identifies the strongest target of the MF output signal or the strongest target of the ZCF output signal as the strongest target in the histogram. The switch-over criteria, together with other processing described herein, effectively rejects a false target caused by cross-talk to achieve robustness against cross-talk and long detection range. Details of the peak finding circuit and algorithms are discussed hereinafter.

Figure 2:
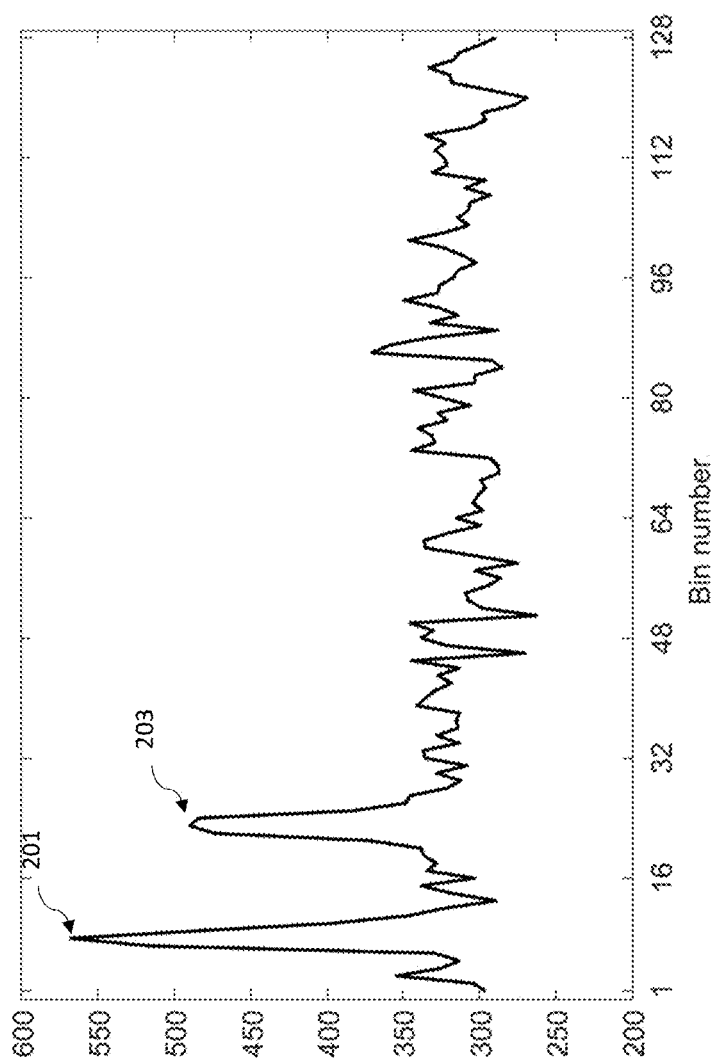
FIG. 2 illustrates a histogram generated by a ToF imager, in an embodiment.

FIG. 2 illustrates a histogram generated by a ToF imager, in an embodiment. The histogram in the example of FIG. 2 has about 128 bins (also referred to as histogram bins). For simplicity, FIG. 2 shows the envelope of the histogram bins, with the understanding that the histogram comprises a plurality of bar-shaped bins (see, e.g., 109 in FIG. 1), and each bin corresponds to a distance (or a range of distance) between the SPAD array 101 and the object 105 (e.g., target) reflecting the light signal. In the discussion herein, it is assumed that the light source 103 and the SPAD array 101 are co-located such that the distance between the SPAD array 101 and the object 105 is considered the same as the distance between the light source 103 and the object 105. For ease of discussion, each bin of the histogram is assigned a distance (e.g., a distance corresponding to the center of the bin), and the distance corresponding to a bin is also referred to as the distance of the bin, or bin distance.

In the example of FIG. 2, the histogram includes a peak 201 and a peak 203. The peak 201 is caused by cross-talk, and is located in a bin having a very small bin distance (e.g., a few centimeters or a few millimeters). The peak 203, which is in a bin further away from the SPAD array 101, is caused by a target.

Figure 3:
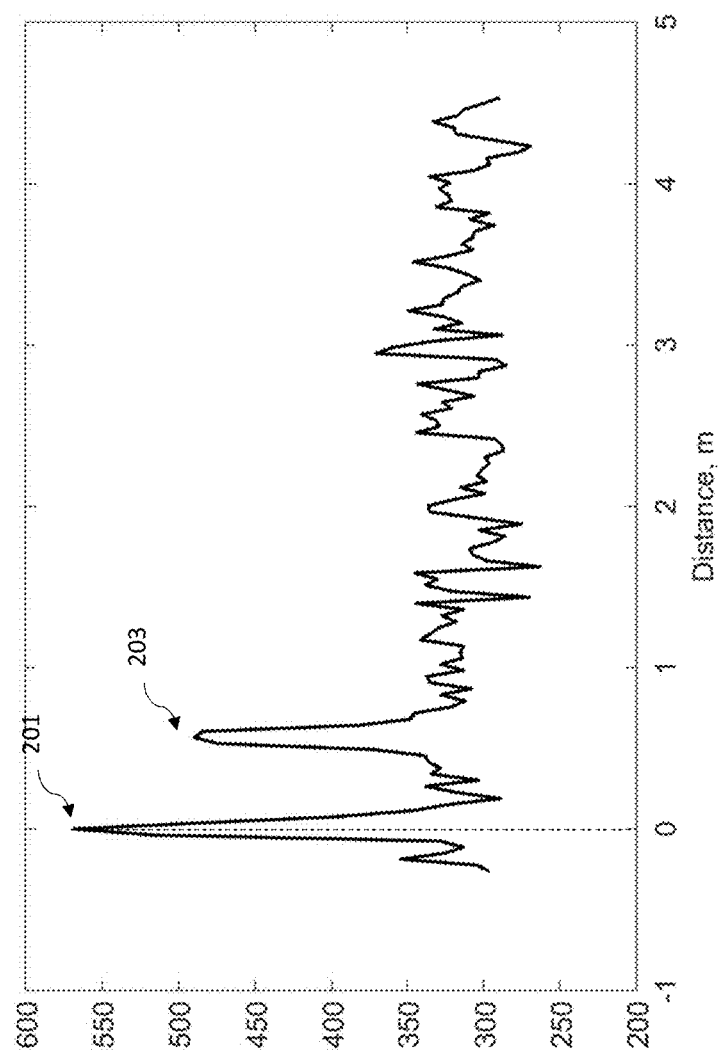
FIG. 3 illustrates a different view of the histogram of FIG. 2, in an embodiment.

FIG. 3 illustrates a different view of the histogram of FIG. 2, in an embodiment. In FIG. 3, the x-axis is converted from bin number to distance (e.g. in meters). In addition, the histogram in FIG. 3 has been shifted to the left with respect to the zero point on the x-axis by an amount of time that is equal to the time needed for light to travel between the SPAD array 101 and the window of the assembly housing. The shifting of the histogram corresponds to a calibration of the bin distance, such that the bin distance now represents the external distance between the target and the window of the assembly housing. Therefore, the zero point on the x-axis of the histogram in FIG. 3 is also referred to as the reference zero-point. Note that due to the calibration effect of the reference zero-point, the peak 201 is now at distance zero in FIG. 3.

Figure 4:
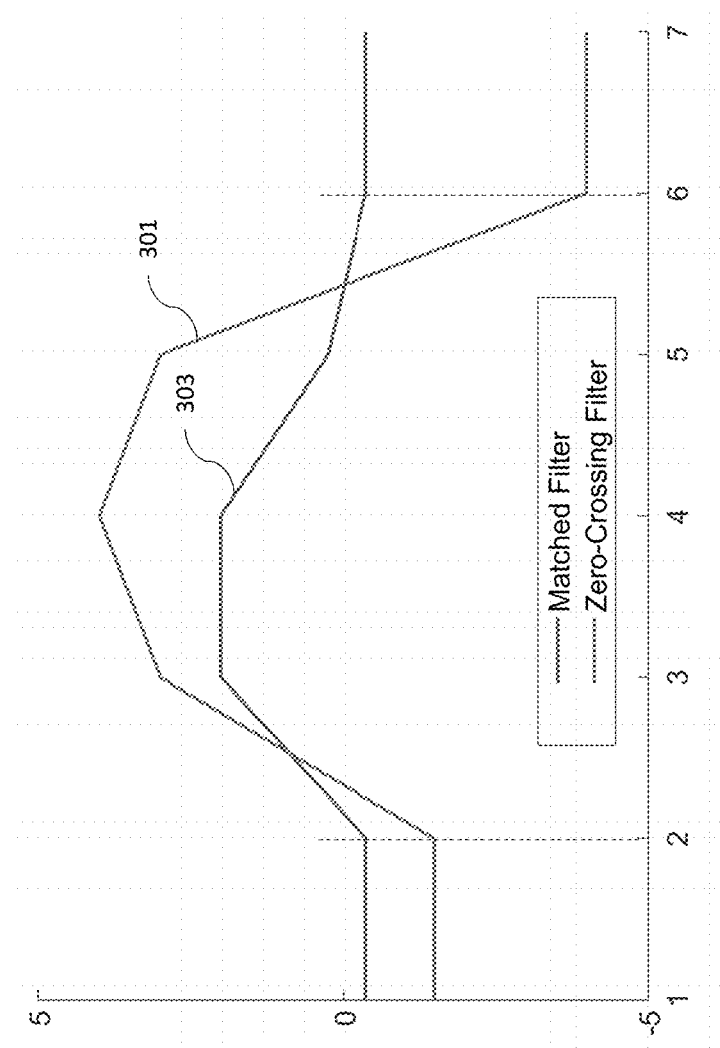
FIG. 4 illustrates a matched filter (MF) and a zero-crossing filter (ZCF), in an embodiment.

FIG. 4 illustrates a matched filter (MF) and a zero-crossing filter (ZCF), in an embodiment. In the example of FIG. 4, curve 301 illustrates a ZCF, and curve 303 illustrates a MF. The MF and ZCF are finite impulse response (FIR) digital filters in the illustrated embodiments. Note that the curves 301 and 303 illustrate the envelope of the coefficients of the MF and ZCF for simplicity, with the understanding that each of the MF and ZCF has a plurality of filter coefficients, e.g., at tap location labeled as 1, 2, . . . , 7 in FIG. 4. The curves 301 and 303 may be formed by connecting the dots representing the values of the coefficients of each filter.

$NTW_{FWHM} N \times T = W_{FWHM}$ In FIG. 4, the curve 301 illustrates an example of a ZCF. The ZCF in FIG. 4 has a pulse region between the two vertical dashed lines. The width of the pulse region is equal to the full width at half maximum (FWHM) of the pulse shape of the emitter 103 of the ToF imager 100, in some embodiments. The shape of the pulse region matches or approximates the pulse shape of the emitter 103, in some embodiments. For example, if the number of coefficients in the pulse region is, and the bin width (e.g., width of the histogram bin measured in time) of the histogram is, and the FWHM of the pulse shape of the emitter 103 (e.g., a VCSEL) is denoted as, then:

$$NTW_{FWHM} N \times T = W_{FWHM} \qquad (1)$$

The FWHM of the pulse shape of the light source 103 may be determined by a characterization process of the emitter 103, where measurements of the pulse shape of the emitter 103 are performed in, e.g., a calibration process. Characterization of the emitter 103 is known, and therefore, details are not discussed here.

In FIG. 4, the coefficients of the ZCF before the pulse region has a first negative value, the coefficients of the ZCF after the pulse region have a second negative value smaller than the first negative values, and the sum of the coefficients of the ZCF has a negative value. Zero-crossing filters (ZCFs) are also referred to as differential correlator filters (DCFs). Design and application of DCFs for target detection are discussed in U.S. patent application Ser. No. 17/858,421, titled "Differential Correlator Filter for Efficient ToF Peak Finding," which application is incorporated by reference herein.

In FIG. 4, the MF filter, as illustrated by the curve 303, also has a pulse region between the two vertical lines. The width of the pulse region is equal to the full width at half maximum (FWHM) of the pulse shape of the emitter 103 of the ToF imager 100, in some embodiments. The shape of the pulse region matches or approximates the pulse shape of the emitter 103, in some embodiments. The coefficients of the MF before and after the pulse region may have slight negative values, and a sum of the coefficients of the MF is zero or substantially zero, in some embodiments. MF is known and used in the art, details are not discussed here.

Figure 5:
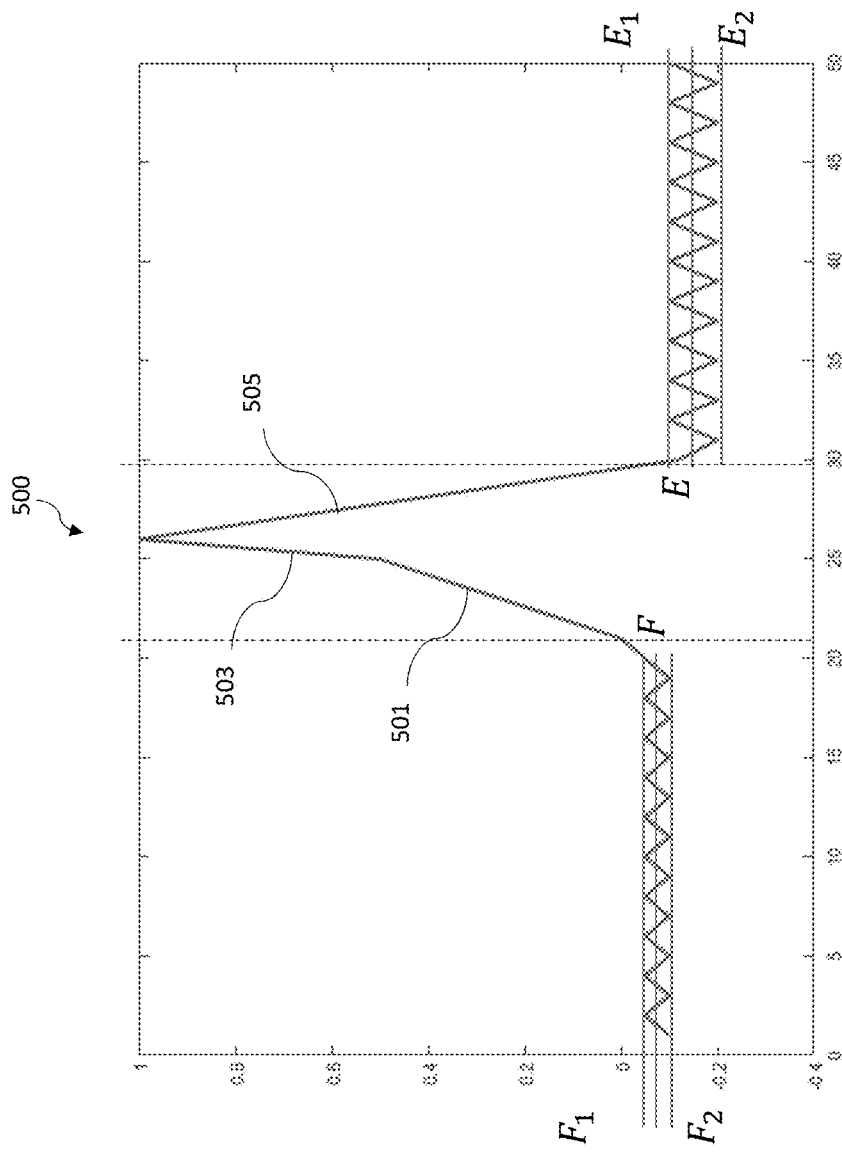
FIG. 5 illustrates a zero-crossing filter (ZCF), in another embodiment.

FIG. 5 illustrates a zero-crossing filter (ZCF) 500, in another embodiment. The ZCF 500 is longer (e.g., has more coefficients) than the ZCF in FIG. 4. The ZCF 500 has a pulse region between the two vertical dashed lines in FIG. 5. The pulse region includes a rising edge region 501, a falling edge region 505, and an accumulation region 503 between the rising edge region 501 and the falling edge region 505. The width of the pulse region is equal to the full width at half maximum (FWHM) of the pulse shape of the emitter 103 of the ToF imager 100. The shape of the pulse region matches or approximates the pulse shape of the emitter 103, in some embodiments.

The ZCF 500 also includes a pre-pulse region. The coefficients in the pre-pulse region oscillates (e.g., alternates) between negative values F1 and F2. The ZCF 500 also includes a post-pulse region. The coefficients in the post-pulse region oscillates between negative values E1 and E2. In some embodiments, the average value F of values F1 and F2 (e.g., $F=(F1+F2)/2$) is a first negative value, and the average value E of the values E1 and E2 (e.g., $E=(E1+E2)/2$) is a second negative value smaller than F (e.g., $E<F$). The sum of the coefficients of the ZCF 500 has a negative value, in some embodiments.

Figure 6:
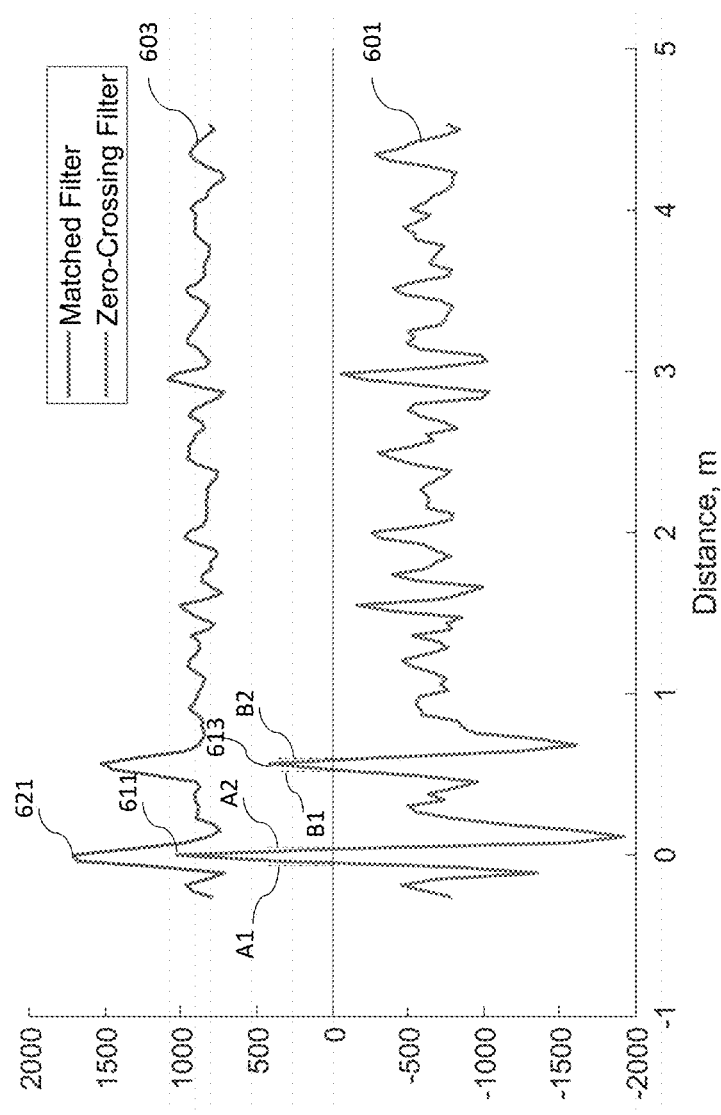
FIG. 6 illustrates output signals of the MF and ZCF of FIG. 4, in an embodiment.

FIG. 6 illustrates output signals of the MF and ZCF of FIG. 4, in an embodiment. In FIG. 6, curve 601 illustrates the ZCF output signal, which is the histogram of FIG. 3 filtered by the ZCF in FIG. 4, and curve 603 illustrates the MF output signal, which is the histogram of FIG. 3 filtered by the MF in FIG. 4. For ease of discussion, the curve 601 is also referred to as ZCF output signal 601, and the curve 603 is also referred to as MF output signal 603. One skilled in the art will readily appreciate that each of the ZCF and MF introduces a known, fixed delay in its output signal, and this delay is compensated for (e.g., removed) when plotting the curves 601 and 603 to allow easy comparison of filter output signals (e.g., the ZCF output signal 601 and MF output signal 603) with the histogram of FIG. 3. In addition, the filter output signals are truncated such that the ZCF output signal 601 and the MF output signal 603 have the same length as the histogram of FIG. 3. In other words, the number of digital values in the ZCF output signal 601 (or the MF output signal 603) is equal to the number of histogram bins in the histogram. Methods to remove the filter-introduced delay from the filter output signal and the truncation described above are known and used in signal processing, thus details are not discussed here.

Note that the ZCF output signal 601 has two positive pulse regions corresponding to the peaks 201 and 203 in FIG. 3, where each positive pulse region (also referred to as pulse region) is defined by a pair of zero-crossing points. For example, the first positive pulse region of the ZCF output signal 601 is between a zero-crossing point A1 (e.g., a negative-to-positive zero-crossing point) and a zero-crossing point A2 (e.g., a positive-to-negative zero-crossing point), and has a maximum peak 611 within the first positive pulse region. Note that for ease of discussion, the notation "zero-crossing point A1" is used to refer to the zero-cross point at distance A1. Similarly, the second positive pulse region of the ZCF output signal 601 is between a zero-crossing point B1 and a zero-crossing point B2, and has a maximum peak 613 within the second positive pulse region.

The maximum peaks 611 and 613 are potential targets in the ZCF output signal 601. A classification process is performed subsequently to determine whether each maximum peak (e.g., 611 and 613) in the ZCF output signal 601 is caused by cross-talk or not. False target(s) (e.g., 611) caused by cross-talk is rejected, and the remaining maximum peaks (e.g., determined by the classification process to be not caused by cross-talk) are further validated (e.g., by checking that their confidence levels, such as signal-to-noise ratios, are above a confidence threshold), and the validated remaining maximum peaks are used to form a list of ZCF targets. The strongest ZCF target in the list of ZCF targets is compared with the strongest MF target (e.g., a maximum peak in the MF output signal 603 that is further than a pre-determined distance and having a confidence level higher than a confidence threshold), and the stronger one of the two is selected as the strongest target in the histogram. In addition, the strongest MF target and the list of ZCF targets are combined to form a list of targets in the histogram, which may be used for further processing. Details are discussed hereinafter.

Figure 7:
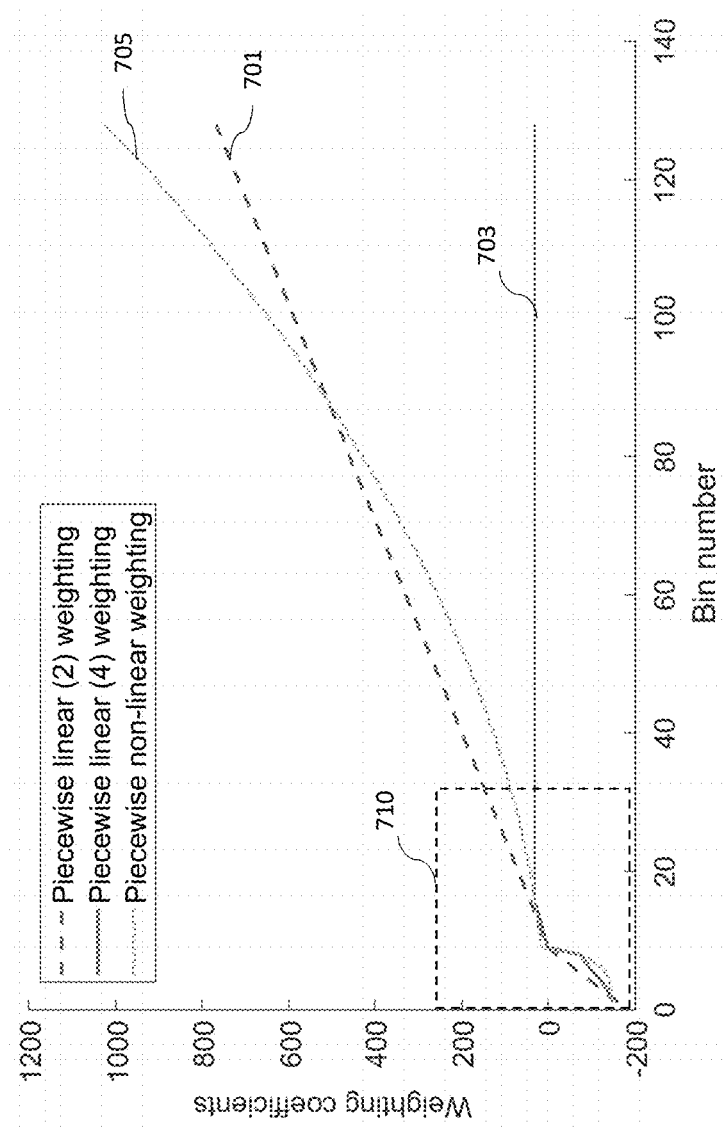
FIG. 7 illustrates weight coefficients for the histogram of FIG. 2, in some embodiments.

FIG. 7 illustrates weight coefficients for the histogram of FIG. 2, in some embodiments. Three sets of weight coefficients, shown as curves 701, 703, and 705, are illustrated in FIG. 7 as non-limiting examples. The weight coefficients in a set (e.g., 701, 702, or 703) are used to calculate a weighted sum for each of the positive pulse regions of the ZCF output signal 601, details are discussed below with reference to FIG. 9.

Referring to the curve 701 in FIG. 7, each histogram bin has a respective weight coefficient, and the weight coefficients in all histogram bins are plotted to form the curve 701. The curve 701 includes two linear segments, and the curve 701 increase from a negative value (e.g. a negative weight coefficient) for the first histogram bin to a positive value (e.g., a positive weight coefficient) for the last histogram bin.

The curve 703 in FIG. 7 shows another example of the histogram weight coefficients. The curve 703 includes four linear segments the increase from a negative weight coefficient for the first histogram bin to a positive weight coefficient for the last histogram bin. The curve 705 in FIG. 7 shows yet another example for the histogram weight coefficients. The curve 705 includes two non-linear segments the increase from a negative weight coefficient for the first histogram bin to a positive weight coefficient for the last histogram bin. The first non-linear segment (on the left) may be portions of an exponential curve with an offset, and the second non-linear segment (on the right) may be portions of a quadratic curve, as an example.

Figure 8:
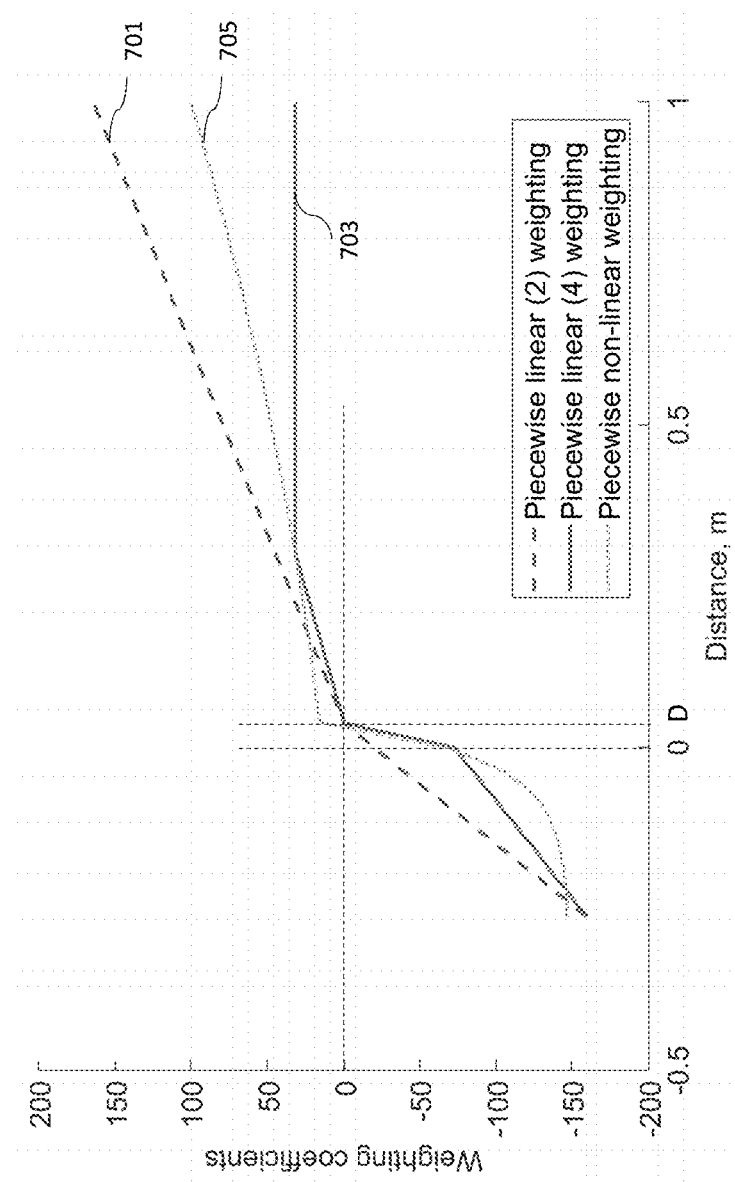
FIG. 8 illustrates a zoomed-in view of the weight coefficients of FIG. 7, in an embodiment.

FIG. 8 illustrates a zoomed-in view of the weight coefficients of FIG. 7 in an area 710 of FIG. 7, in an embodiment. Note that the x-axis in FIG. 8 is converted into distance (e.g., in meters), and the zero point on the x-axis is the reference zero-point. As illustrated in FIG. 8, for each set of weight coefficients, the weight coefficients before the reference zero-point have negative values. At a short distance D after the reference zero-point, which corresponds to a few histogram bins after the histogram bin that corresponds to the reference zero-point, the weight coefficient reaches the value of zero. The weight coefficients after the distance D have positive values. In the illustrated embodiments, each of the curves 701, 703, and 705 increases continuously (e.g., increasing monotonously), at least until it reaches a final positive value, and may stay stable (e.g., flat) at the final positive value for a number of histogram bins (see, e.g., curve 703).

Figure 9:
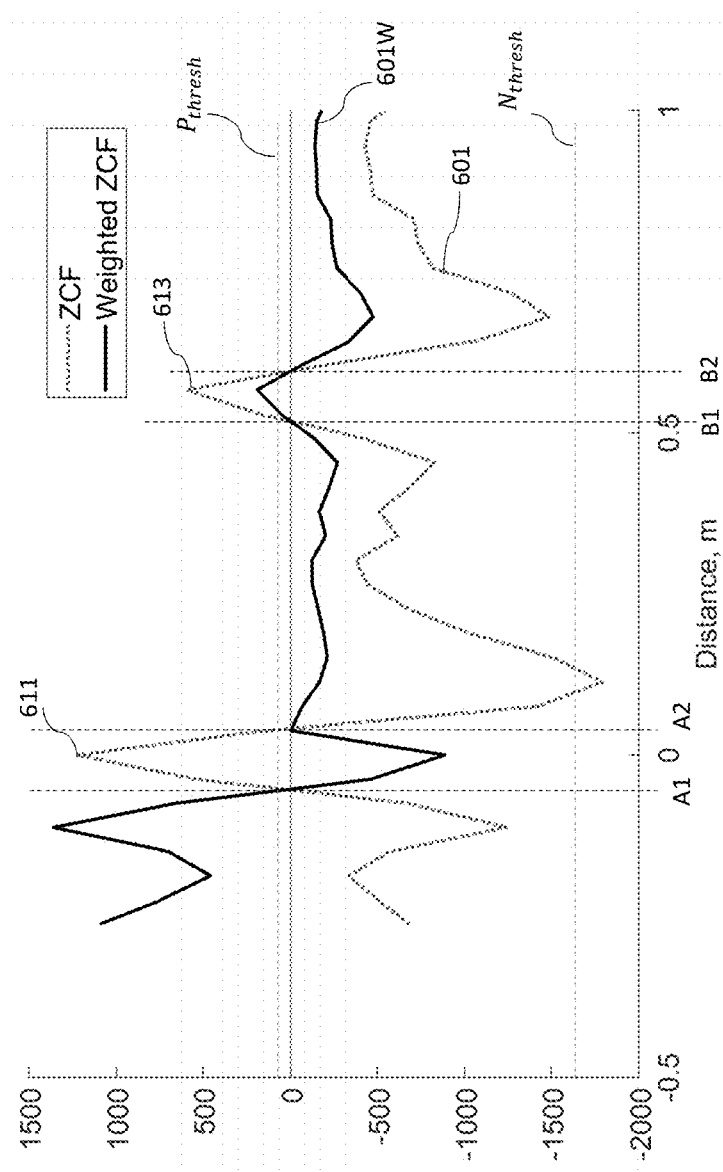
FIG. 9 illustrates processing of the histogram of FIG. 2 using weight coefficients for the histogram, in an embodiment.

FIG. 9 illustrates processing of the histogram of FIG. 2 using the weight coefficients for the histogram, in an embodiment. The processing of FIG. 9 may also be referred to as ZCF based target detection. In FIG. 9, only the beginning portion (e.g., for distance up to 1 m) of the ZCF output signal 601 in FIG. 6 is plotted, since there is no positive pulse region in the ZCF output signal 601 after the plotted region. In addition, the curve 601W illustrates the ZCF output signal 601 weighted (e.g., scaled, or multiplied) by corresponding weight coefficients of the histogram. In the example of FIG. 9, the histogram weight coefficients used for generating the curve 601W is the set of weight coefficient illustrated by the curve 703 in FIG. 8.

In some embodiments, the curve 601W is generated by multiplying each output value of the ZCF output signal 601 with a corresponding weight coefficient. For example, the first output value of the ZCF output signal 601 is multiplied with the weight coefficient for the first histogram bin, the second output value of the ZCF output signal 601 is multiplied with the weight coefficient for the second histogram bin, and so on. In the example of FIG. 9, the weight coefficients before distance A2 have negative values, and the weight coefficients after distance A2 have positive values. Therefore, before distance A2, values of the curve 601W have opposite signs from the corresponding values of the ZCF output signal 601 at the same distance. After distance A2, values of the curve 601W have the same signs as the corresponding values of the ZCF output signal 601. Note that the distance A2 in FIG. 9 happens to be the same as the distance D in FIG. 8, this is merely a coincidence.

Next, the maximum peak in each of the positive pulse regions of the ZCF output signal 601 is identified. For example, for the first positive pulse region between the pair of zero-crossing points A1 and A2, the maximum peak 611 is identified. For the second positive pulse region between the pair of zero-crossing points B1 and B2, the maximum peak 613 is identified. In addition, a weighted sum is calculated for each of the positive pulse regions of the ZCF output signal 601. For example, the values of the curve 601W between the zero-crossing points A1 and A2 are summed together to generate a first weighted sum for the first positive pulse region of the ZCF output signal 601, and the values of the curve 601W between the zero-crossing points B1 and B2 are summed together to generate a second weighted sum for the second positive pulse region of the ZCF output signal 601.

The maximum peaks (e.g., 611 and 613) in the positive pulse regions of the ZCF output signal 601 represent potential targets for the ToF imager. However, some maximum peak(s), such as the maximum peak 611, may be caused by cross-talk and represent false target. A classification process is performed to classify the maximum peaks and to determine if each maximum peak is a valid target (e.g., instead of a false target). Details are discussed below.

Denote, from left to right, the positive pulse regions in the ZCF output signal 601 as the first positive pulse region, the second positive pulse region, and so on. The maximum peak in the i-th positive pulse region is referred to as the i-th maximum peak. To classify the i-th maximum peak, the weighted sum for the i-th positive pulse region, denoted as WS(i), is compared with a positive threshold $P_{thresh}$ and a negative threshold $N_{thresh}$. If the weighted sum WS(i) is larger than the positive threshold $P_{thresh}$ or smaller than the negative threshold $N_{thresh}$, the i-th maximum peak is classified as a first type of peak, which means the i-th maximum peak is a potentially valid target. If the weighted sum WS(i) is between the positive threshold $P_{thresh}$ and the negative threshold $N_{thresh}$ (e.g., $N_{thresh} \leq WS(i) \leq P_{thresh}$), then the i-th maximum peak is classified as a second type of peak, which means that the i-th maximum peak is either a false target caused by cross-talk, or may be caused by ambient noise in the histogram (e.g., no target in the i-th positive pulse region). The positive threshold $P_{thresh}$ and the negative threshold $N_{thresh}$ may be found by computer simulations, measurements using real, known data (e.g., training data) from ToF imagers, combinations thereof, or the like. In some embodiments, the positive threshold $P_{thresh}$ is a smaller positive value, and the negative threshold $N_{thresh}$ has a negative value with a larger magnitude (e.g., absolute value) than the magnitude of the positive threshold $P_{thresh}$.

In some embodiments, each of the potentially valid targets identified by the classification process is further validated by checking the confidence level of the potentially valid target with a confidence threshold. The confidence level may be represented by, e.g., the signal-to-noise ratio (SNR) to the potentially valid target. For example, if the SNR of the potentially valid target is above a certain threshold, then the potentially valid target is validated as a (valid) ZCF target, and all of the validated ZCF targets are recorded in a list of ZCF targets. Methods for calculating the SNR of a signal (e.g., the potentially valid target) are known in the art, thus details are not discussed here. In some embodiments, parameters recorded in the list of ZCF targets for each ZCF target include: the distance (or equivalently, the bin index or bin number) of the ZCF target, the zero-crossing points of the positive pulse region containing the ZCF target, the value of the maximum peak corresponding to the ZCF target, the weighted sum of the positive pulse region containing the ZCF target, and the confidence level (e.g., SNR) of the ZCF target.

Referring back temporarily to FIG. 8, by assigning negative values to weight coefficients of histogram bins at distance closer than the distance D, the weighted sum calculation described above penalizes values of the positive pulse region before the distance D, because these values are mostly likely caused by cross-talk, and a real target is most likely not located at such a close distance to the ToF imager. Therefore, the negative histogram weight coefficient values help to reject false target caused by cross-talk, thereby achieving robustness against cross-talk in target detection.

In some embodiments, due to the sum of the coefficients of the ZCF filter being negative, the ZCF filter introduces signal-to-noise ratio (SNR) attenuation. Therefore, while the ZCF output signal can be used to detect close target with improved robustness against cross-talk, ZCF based target detection may not perform well for far-away target. A far-away target generally has weaker reflection, which, together with the SNR attenuation introduced by the ZCF filter, may make it difficult to be detected using the ZCF output signal.

The MF output signal may be used to detect target by finding the strongest peak (e.g., having largest amplitude) in the MF output signal. This is referred to as MF based target detection. The MF amplifies the signal region (e.g., the pulse region corresponding to target or false target) in the histogram and attenuates other signals around the signal region. The MF based target detection described above can achieve long detection range. However, the MF based target detection is very sensitive to cross-talk. The cross-talk signal can easily cause the MF based target detection to incorrectly identify the peak caused by cross-talk as a target. An adaptive target detection method, which switches between the MF based target detection and the ZCF based target detection, achieves robustness against cross-talk while maintaining a long detection range. Details are discussed below.

Figure 10:
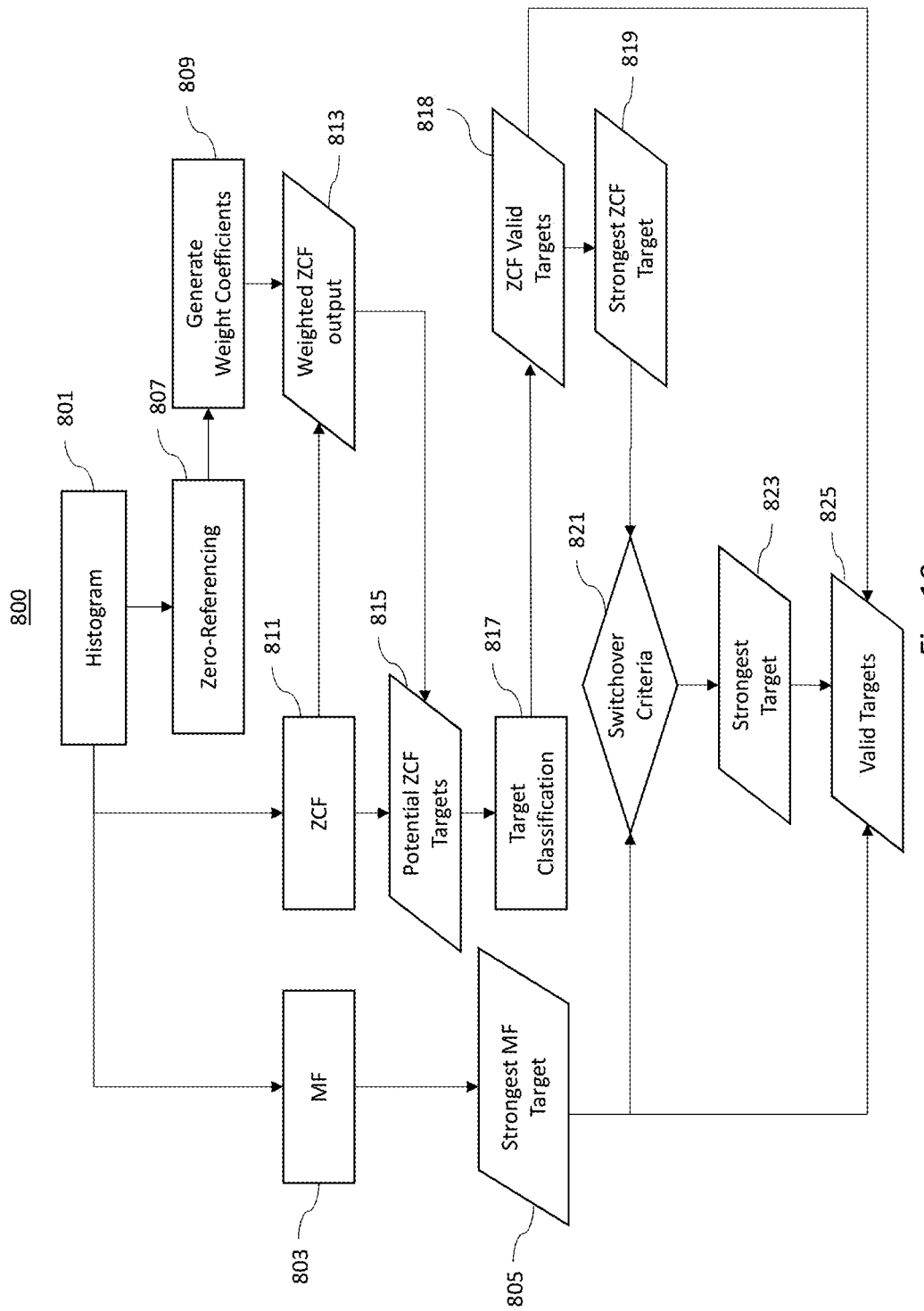
FIG. 10 illustrates a flow chart of an adaptive target detection method for processing the histogram of a ToF imager, in an embodiment.

FIG. 10 illustrates a flow chart of an adaptive target detection method 800 for processing the histogram of a ToF imager, in an embodiment. In block 801 of FIG. 10, a histogram from the ToF imager is received. In block 803, the histogram is filtered by the MF. In block 805, the strongest MF target (also referred to as the MF strongest target) is determined as follows. First, the strongest (e.g., maximum) peak in the MF output signal is found. Next, the distance of the strongest MF peak is compared with a pre-determined distance, referred to as a switch-over point. If the distance of the strongest MF peak is equal to or larger than the switch-over point, the strongest MF peak is considered a potentially valid MF target; otherwise, the strongest MF peak is ignored (since it is likely caused by cross-talk) and no valid MF target is found. Alternatively, the potentially valid MF target may be found by searching the maximum peak in the MF output signal within a range having a distance equal to or larger than switch-over point.

Next, the potentially valid MF target is validated by checking its confidence level (e.g., SNR ratio), and if the confidence level of the potentially valid MF target is above a respective confidence threshold, the potentially valid MF target is output as the strongest MF target. Information regarding the strongest MF target, such as the location (e.g., the bin index, or the distance), the value of the maximum peak corresponding to the strongest MF target, and the confidence level, are stored.

In some embodiments, the switch-over point is the maximum ranging distance of the ZCF based detection method subtracted with a margin (e.g., a positive distance value). The margin may be determined by, e.g., ZCF SNR limit, the type of targets being detected, the amount of ambient noise, or other performance considerations. As a non-limiting example, the switch-over point may be half of the maximum ranging distance of the ZCF based detection method.

In block 807, the histogram bin having a distance equal to the distance between the SPAD array 101 and the window of the assembly housing is identified, and its location is used as the reference zero-point. In block 809, weight coefficients for the histogram bins are generated. Non-limiting examples of the weight coefficients are given in FIGS. 7 and 8. Note that the processing of blocks 807 and 809 may be performed only once, and the resulting weight coefficients may be saved for future use.

Still referring to FIG. 10, in block 811, the histogram is filtered by the ZCF. In block 815, the maximum peaks in the positive pulse regions of the ZCF output are found. The maximum peaks are potential targets in the ZCF output signal. Information of each maximum peak, such as the location (e.g., the bin index, or the distance) and the value (e.g., the amplitude) of the maximum peak, are stored. In addition, the zero-crossing points defining each positive pulse region are found, and a weighted sum for each of the positive pulse region in the ZCF output signal is calculated, details are discussed above with reference to FIG. 9.

Next, in block 817, the potential targets found in block 815 are classified as the first type of peaks or the second type of peaks, using the classification process discussed above. Maximum peaks identified as the second type of peaks are rejected, since they are considered as being caused by cross-talk or by ambient noise. In block 818, the maximum peaks identified as the first type of peaks are considered potentially valid ZCF targets. The potentially valid ZCF targets are further validated by checking their confidence levels. Potentially valid ZCF targets with high confidence levels are output as valid ZCF targets and form a list of ZCF targets. Details are discussed above with reference to FIG. 9.

Next, in block 819, the strongest ZCF target (also referred to as ZCF strongest target) in the list of ZCF targets is found. Next, in block 821, the strongest MF target and the strongest ZCF target are processed by a decision module using a switch-over criteria. In some embodiments, the decision module compares the strongest MF target and the strongest ZCF target, and chooses the stronger of the two (e.g., the strongest MF target and the strongest ZCF target) and outputs it in block 823 as the strongest target (e.g., strongest among all targets) determined by the adaptive detection method. Note that if no strongest MF target is found in block 805, and if the strongest ZCF target is found in block 819 (e.g., when the list of ZCF targets is not empty), then the decision module outputs the strongest ZCF target as the strongest target determined by the adaptive detection method. Conversely, if the strongest MF target is found in block 805, and if no strongest ZCF target is found in block 819 (e.g., when the list of ZCF targets is empty), then the decision module outputs the strongest MF target as the strongest target determined by the adaptive detection method. If neither the strongest MF target nor the strongest ZCF target is found, then the decision module declares that no strongest target is found by the adaptive detection method.

Furthermore, in block 825, the strongest MF target and the list of ZCF targets are combined to form a list of targets determined by the adaptive detection method. A non-existent strongest MF target (e.g., when the strongest MF target is not found in block 805) or an empty list of ZCF targets does not contribute to the list of targets. The strongest target in block 823 may also be added to the list of targets and labeled as the strongest target among all the targets. The list of targets formed in block 825 may be sent to signal processing blocks for further processing and for extracting further information.

Figure 13:
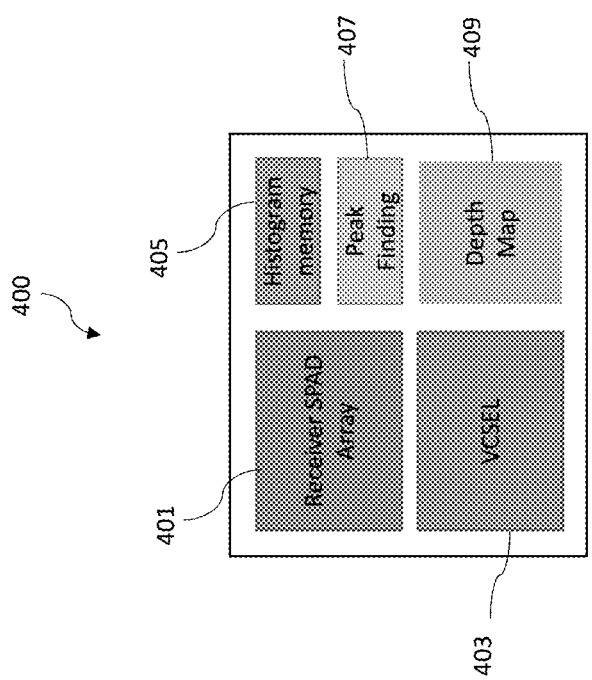
FIG. 13 illustrates an integrated circuit (IC) device formed as a ToF imager, in an embodiment.

The function blocks in FIG. 10, or portions of them, may be implemented by a peak finding circuit (see, e.g., 407 in FIG. 13). The peak finding circuit may be implemented as circuit formed in an integrated circuit (IC) device.

Figure 11:
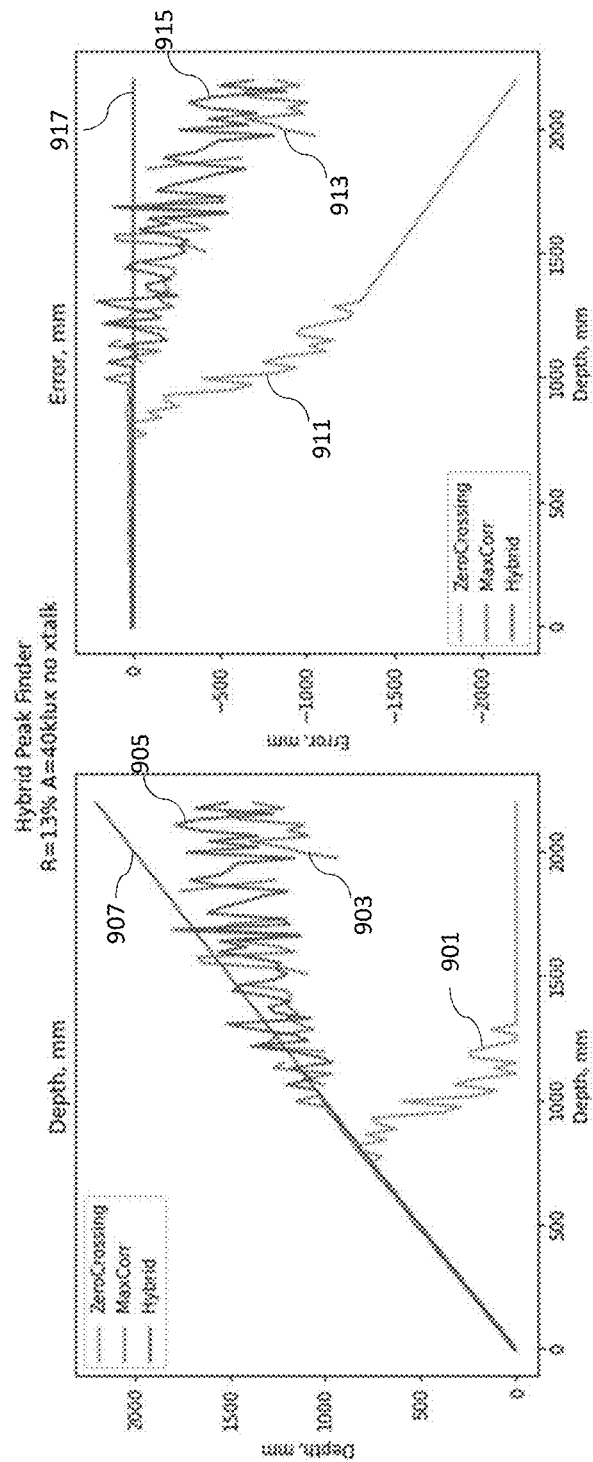
FIG. 11 illustrates performance of the adaptive target detection method of FIG. 10, in an embodiment.

FIG. 11 illustrates performance of the adaptive target detection method of FIG. 10 for the strongest target detection in a single target environment, in an embodiment. In the example of FIG. 11, no cross-talk is present. The subplot on the left side of FIG. 11 shows the true target distance along the x-axis versus the detected target distance along the y-axis. The curve 905 shows the performance of the adaptive target detection method (also referred to as a hybrid detection method) of FIG. 10. For comparison, curve 901 shows the performance using the ZCF based target detection (e.g., using the ZCF strongest target as detected target), and curve 903 shows the performance of the MF based target detection (e.g., using the strongest MF peak as the detected target). The curve 907 shows the ideal detection performance (y=x). The subplot on the right side of FIG. 11 shows the detection error (difference between true target location and detected target location). The curves 911, 913, 915, and 917 correspond to the detection method for curves 901, 903, 905, and 907, respectively.

As illustrated in FIG. 11, when no cross-talk is present, the ZCF based detection is effective for close range detection, but was unable to correctly detect target at long range due to the SNR attenuation, as shown by the curves 901 and 911. In contrast, the MF based target detection was able to detect target correctly to a longer range than the ZCF based target detection, as shown by the curves 903 and 913. The adaptive detection method, by switching between MF based target detection and ZCF based target detection (e.g., choosing the ZCF based detection at close range and the MF based detection at long range if appropriate), was able to achieve correct target detection for a range comparable to that of the MF based target detection method, as shown by the curves 905 and 915.

Figure 12:
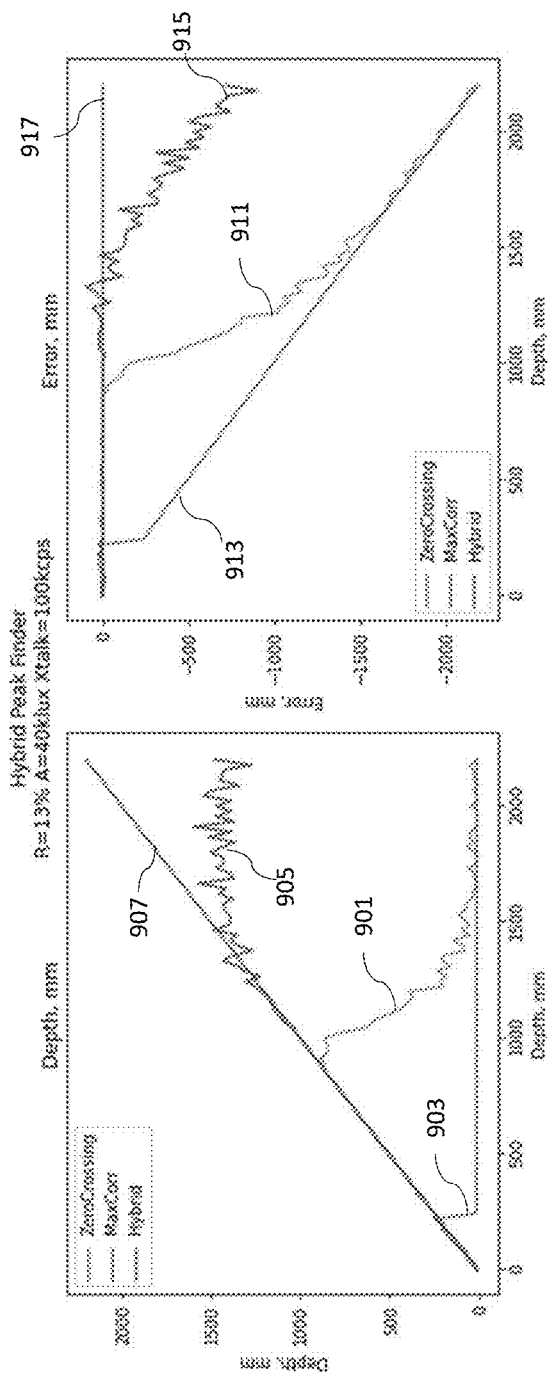
FIG. 12 illustrates performance of the adaptive target detection method of FIG. 10, in another embodiment.

FIG. 12 illustrates performance of the adaptive target detection method of FIG. 10 for the strongest target detection in a single target environment, in another embodiment. In the example of FIG. 12, cross-talk is present. As illustrated in FIG. 12, when cross-talk is present, the MF based target detection, due to its sensitivity to cross-talk, locks on to the false target generated by cross-talk, and was unable to detect target correctly at close range, as shown by the curves 903 and 913. The ZCF based detection is able to reject the false target generated by cross-talk, and is effective for up to a certain range, but was unable to correctly detect target at long range due to the SNR attenuation, as shown by the curves 901 and 911. In contrast, the adaptive detection method, by switching between MF based detection and ZCF based detection (e.g., choosing the ZCF based detection at close range and the MF based detection at long range if appropriate), was able to achieve correct target detection for a range comparable to that of the MF based target detection method, as shown by the curves 905 and 915. Note that in the adaptive detection method, the strongest MF peak at close range is not identified as a valid MF target, thus the ZCF strongest target is chosen as the detected target at close range.

FIG. 13 illustrates an integrated circuit (IC) device 400 formed as a ToF imager, in an embodiment. Note that for simplicity, not all features of the IC device 400 are illustrated. The IC device 400 includes a light source 403 (e.g., a VCSEL, an LED, or the like) and a SPAD array 401. The IC device 400 further includes a memory module 405 for storing the histogram data from the SPAD array 401. Notably in FIG. 13, a peak finding circuit 407 is integrated in the IC device 400, which includes circuits for implementing some or all of the functional blocks in FIG. 10 (e.g., MF, ZCF, maximum peak searching, calculating the weighted sum, decision making using the switch-over criteria, etc.). The output of the peak finding circuit 407 may be used to generate a depth map stored in a depth map memory 409. Note that the peaking finding circuit 407 performs on-chip processing of the histogram data from the SPAD array 401, which significantly reduces the chip complexity related to I/O transfer of histogram data to an off-chip processing module, and reduces the processing delay related to off-chip processing. The IC device 400 may produce a detected target, and/or a depth map directly as an output, instead of relying on an off-chip processing module to produce the depth map.

Figure 14:
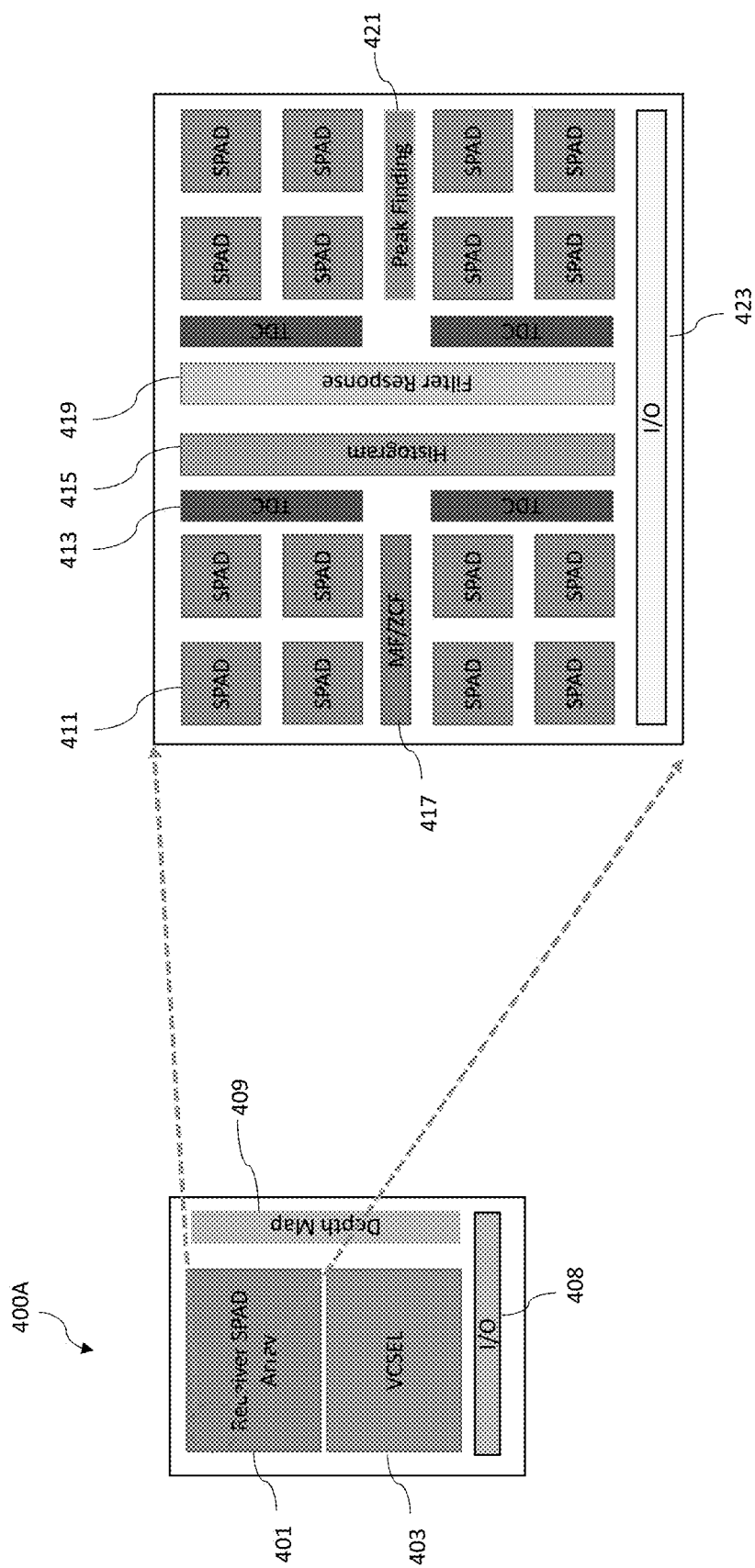
FIG. 14 illustrates an integrated circuit (IC) device formed as a ToF imager, in another embodiment.

FIG. 14 illustrates an integrated circuit (IC) device 400A formed as a ToF imager, in another embodiment. Note that for simplicity, not all features of the IC device 400A are illustrated. The IC device 400A includes a SPAD array 401, a light source 403, and a depth map memory 409. An I/O circuit 408 may be formed in the IC device 400A for communication with another device.

Note that in FIG. 13, the peak finding circuit 407 is disposed outside of the SPAD array 401, and processes the histograms from the SPAD array stored in the memory module 405. In contrast, in FIG. 14, the MF and ZCF are integrated at the pixel level, e.g., integrated with each SPAD in the SPAD array. In some embodiments, each SPAD in the SPAD array has a respective MF and a respective ZCF for processing its histogram data. In some embodiments, a few neighboring SPADs in the SPAD array may share an MF and a ZCF. The right-hand side portion of FIG. 14 shows a zoomed-in view of a portion of the SPAD array 401, which shows a plurality of SPADs 411 of the SPAD array 401, the TDCs 413, a histogram memory 415 for storing histogram data from the SPADs 411, a MF/ZCF 417 (e.g., a MF and a ZCF), a filter response memory 419 for storing the output of the MF/ZCF 417, a peak finding circuit 421 (e.g., for implementing some of the functional blocks in FIG. 10), and an I/O circuit 423. Note that the numbers of the SPADs 411, the TDCs 413, the histogram memory 415, the MF/ZCF 417, the filter response memory 419, and the I/O circuit 423 illustrated in FIG. 14 are for illustration purpose only and are non-limiting, other numbers are also possible and are fully intended to be included within the scope of this disclosure.

In some embodiments, the IC structure illustrated in FIG. 14 allows each pixel (e.g., each SPAD) of the SPAD array 401 to output the extracted target information directly, instead of the raw histogram data. In addition, the IC structure illustrated in FIG. 14 is well suited for parallel processing of all the pixels in the SPAD array 401 simultaneously, thereby reducing processing delay and allowing for SPAD arrays with high resolution to be formed easily.

Modifications to the disclosed embodiments are possible and are fully intended to be included within the scope of the disclosure. For example, in FIG. 9, to calculate the weighted sum for each positive pulse region of the ZCF output signal 601, only the values of the ZCF output signal 601 in each positive pulse region need to be multiplied with the corresponding weight coefficients, this reduces the multiply-and-add operations needed to calculate the weighted sum.

Figure 15:
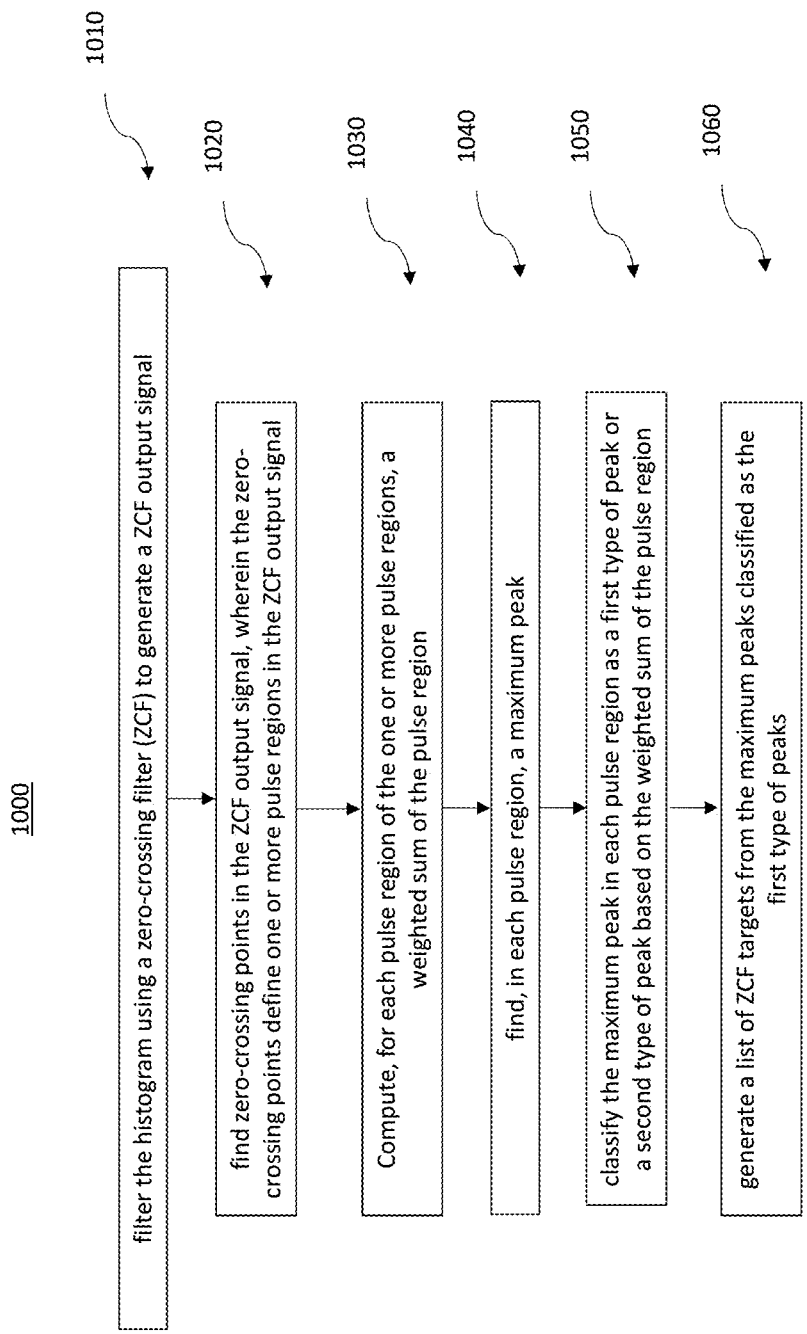
FIG. 15 illustrates a flow chart of a method for processing a histogram generated by a time-of-flight (ToF) imager, in some embodiments.

FIG. 15 illustrates a flow chart of a method for processing a histogram generated by a time-of-flight (ToF) imager, in some embodiments. It should be understood that the embodiment method shown in FIG. 15 is merely an example of many possible embodiment methods. One of ordinary skill in the art would recognize many variations, alternatives, and modifications. For example, various steps as illustrated in FIG. 15 may be added, removed, replaced, rearranged, or repeated.

Referring to FIG. 15, at block 1010, the histogram is filtered using a zero-crossing filter (ZCF) to generate a ZCF output signal. At block 1010, zero-crossing points are found in the ZCF output signal, wherein the zero-crossing points define one or more pulse regions in the ZCF output signal. At block 1030, for each pulse region of the one or more pulse regions, a weighted sum of the pulse region is computed. At block 1040, in each pulse region, a maximum peak is found. At block 1050, the maximum peak in each pulse region is classified as a first type of peak or a second type of peak based on the weighted sum of the pulse region. At block 1060, a list of ZCF targets is generated from the maximum peaks classified as the first type of peaks.

Disclosed embodiments may achieve advantages. For example, the disclosed ZCF based target detection method can reject false target caused by cross-talk, thus achieving robustness against cross-talk. The ZCF based detection, however, suffers in detection range due to SNR attenuation. The MF based target detection method achieves long detection range, but is sensitive to cross-talk. By switching between the ZCF based detection method and the MF based detection method based on the switch-over criteria, the disclosed adaptive detection method enjoys benefit from both the ZCF based detection and MF based detection, thereby achieving robustness against cross-talk while still maintaining long detection range.

Example embodiments of the present invention are summarized here. Other embodiments can also be understood from the entirety of the specification and the claims filed herein.

Example 1. In an embodiment, a method of processing a histogram generated by a time-of-flight (ToF) imager includes: filtering the histogram using a zero-crossing filter (ZCF) to generate a ZCF output signal; finding zero-crossing points in the ZCF output signal, wherein the zero-crossing points define one or more pulse regions in the ZCF output signal; computing, for each pulse region of the one or more pulse regions, a weighted sum of the pulse region; finding, in each pulse region, a maximum peak; classifying the maximum peak in each pulse region as a first type of peak or a second type of peak based on the weighted sum of the pulse region; and generating a list of ZCF targets from the maximum peaks classified as the first type of peaks.

Example 2. The method of Example 1, wherein computing, for each pulse region of the one or more pulse regions, the weighted sum of the pulse region comprises: multiplying values of the ZCF output signal in the pulse region with respective weight coefficients of the histogram to generate weighted ZCF output values; and summing up the weighted ZCF output values to generate the weighted sum of the pulse region.

Example 3. The method of Example 2, wherein a weight coefficient is assigned for each histogram bin of the histogram, wherein a first plurality of weight coefficients before a reference zero-point of the histogram have negative values, and a second plurality of weight coefficients after the reference zero-point of the histogram have positive values.

Example 4. The method of Example 3, wherein the reference zero-point of the histogram is a histogram bin that corresponds to a distance between an emitter of the ToF imager and a window of an assembly housing of the ToF imager, wherein the emitter is configured to send a light signal through the window of the assembly housing.

Example 5. The method of Example 2, wherein classifying the maximum peak in each pulse region comprises: classifying the maximum peak as the first type of peak if the weighted sum of the pulse region is larger than a positive threshold or smaller than a negative threshold; and classifying the maximum peak as the second type of peak if the weighted sum of the pulse region is between the positive threshold and the negative threshold.

Example 6. The method of Example 5, further comprising: filtering the histogram using a matched filter (MF) to generate an MF output signal; finding a strongest MF target in the MF output signal; and generating a list of targets in the histogram by combining the strongest MF target and the list of ZCF targets.

Example 7. The method of Example 6, further comprising: identifying the strongest MF target as a strongest target in the histogram if an amplitude of the strongest MF target is larger than an amplitude of a strongest ZCF target in the list of ZCF targets, or if the list of ZCF targets is empty.

Example 8. The method of Example 1, wherein generating the list of ZCF targets comprises: comparing a confidence level of each of the maximum peaks classified as the first type of peak with a confidence threshold; and copying the maximum peaks classified as the first type of peaks and with confidence levels higher than the confidence threshold to the list of the ZCF targets.

Example 9. The method of Example 1, wherein the ZCF comprises: a ZCF pulse region, wherein a width of the ZCF pulse region corresponds to a full width at half maximum (FWHM) of a pulse shape of an emitter of the ToF imager; a pre-pulse region before the ZCF pulse region, wherein first filter coefficients in the pre-pulse region have negative values; and a post-pulse region after the ZCF pulse region, wherein second filter coefficients in the post-pulse region have negative values, wherein a second average of the second filter coefficients is smaller than a first average of the first filter coefficients.

Example 10. The method of Example 9, wherein a sum of the coefficients of the ZCF is a negative value.

Example 11. In an embodiment, a method of processing a histogram generated by a time-of-flight (ToF) imager includes: assigning a weight coefficient for each histogram bin of the histogram; generating a ZCF output signal by filtering the histogram using a zero-crossing filter (ZCF); finding positive pulse regions in the ZCF output signal, wherein each of the positive pulse regions is defined by a pair of zero-crossing points; computing, for each positive pulse region, a weighted sum by multiplying values of the ZCF output signal with corresponding weight coefficients of the histogram bins to generate weighted values of the ZCF signal and by adding the weighted values of the ZCF output signal in each positive pulse region; classifying a maximum peak in each positive pulse region as a first type of peak or a second type of peak based on the weighted sum of the positive pulse region; and creating a list of ZCF targets from the maximum peaks classified as the first type of peaks.

Example 12. The method of Example 11, further comprising: identifying a strongest ZCF target from the list of ZCF targets; generating a matched filter (MF) output signal by filtering the histogram with a MF; identifying a strongest MF target from the MF output signal; and choosing, from the strongest ZCF target and the strongest MF target, a stronger target as a strongest target in the histogram.

Example 13. The method of Example 11, wherein assigning the weight coefficient comprises: assigning negative values for the weight coefficients of histogram bins located before a pre-determined histogram bin; and assigning positive values for the weight coefficients of histogram bins located after the pre-determined histogram bin.

Example 14. The method of Example 13, wherein the weight coefficients of the histogram bins increase along a direction from a first histogram bin of the histogram toward a last histogram bin of the histogram bin.

Example 15. The method of Example 13, wherein classifying the maximum peak in each positive pulse region comprises: classifying the maximum peak as the first type of peak if the weighted sum of the positive pulse region is larger than a first threshold or smaller than a second threshold, wherein the first threshold is larger than the second threshold; and classifying the maximum peak as the second type of peak if the weighted sum of the positive pulse region is between the second threshold and the first threshold.

Example 16. The method of Example 15, wherein the first threshold is a positive value, and the second threshold is a negative value.

Example 17. A time-of-flight (ToF) imager comprises: a light source configured to generate a light signal for illuminating an object; a single-photon avalanche diode (SPAD) configured to generate a histogram for reflected light signal from the object; a zero-crossing filter (ZCF) configured to generate an ZCF output signal by filtering the histogram; a matched filter (MF) configured to generate an MF output signal by filtering the histogram; and a peak finding circuit, wherein the peak finding circuit is configured to identify a list of targets in the histogram using the ZCF output signal and the MF output signal by: finding positive pulse regions in the ZCF output signal, wherein each of the positive pulse regions is defined by a pair of zero-crossing points; computing, for each positive pulse region, a weighted sum of the ZCF output signal in the positive pulse region; classifying a maximum peak in each positive pulse region as a first type of peak or a second type of peak based on the weighted sum of the positive pulse region; generating a list of ZCF targets based on the maximum peaks classified as the first type of peaks; identifying a strongest MF target from the MF output signal; and generating the list of targets in the histogram using the list of ZCF targets and the strongest MF target.

Example 18. The ToF imager of Example 17, wherein the peak finding circuit is configured to identify a strongest target in the histogram by: identifying a stronger one of the strongest MF target and a strongest ZCF target in the list of ZCF targets as the strongest target in the histogram.

Example 19. The ToF imager of Example 17, wherein the peak finding circuit is configured to compute, for each positive pulse region, the weighted sum of the ZCF output signal in the positive pulse region by: multiplying values of the ZCF output signal in the positive pulse region with corresponding weight coefficients to generate weighted values of ZCF output signal; and adding the weighted values of the ZCF output signal in the positive pulse region.

Example 20. The ToF imager of Example 19, wherein the peak finding circuit is configured to classify the maximum peak in each positive pulse region by: classifying the maximum peak as the first type of peak if the weighted sum of the positive pulse region is larger than a first threshold or smaller than a second threshold, wherein the first threshold is larger than the second threshold; and classifying the maximum peak as the second type of peak if the weighted sum of the positive pulse region is between the second threshold and the first threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of processing a histogram generated by a time-of-flight (ToF) imager, the method comprising:
   filtering the histogram using a zero-crossing filter (ZCF) to generate a ZCF output signal;

finding zero-crossing points in the ZCF output signal, wherein the zero-crossing points define one or more pulse regions in the ZCF output signal;

computing, for each pulse region of the one or more pulse regions, a weighted sum of the pulse region;

finding, in each pulse region, a maximum peak;

classifying the maximum peak in each pulse region as a first type of peak or a second type of peak based on the weighted sum of the pulse region; and generating a list of ZCF targets from the maximum peaks classified as the first type of peaks.

2. The method of claim 1, wherein computing, for each pulse region of the one or more pulse regions, the weighted sum of the pulse region comprises:

multiplying values of the ZCF output signal in the pulse region with respective weight coefficients of the histogram to generate weighted ZCF output values; and summing up the weighted ZCF output values to generate the weighted sum of the pulse region.

3. The method of claim 2, wherein a weight coefficient is assigned for each histogram bin of the histogram, wherein a first plurality of weight coefficients before a reference zero-point of the histogram have negative values, and a second plurality of weight coefficients after the reference zero-point of the histogram have positive values.

4. The method of claim 3, wherein the reference zero-point of the histogram is a histogram bin that corresponds to a distance between an emitter of the ToF imager and a window of an assembly housing of the ToF imager, wherein the emitter is configured to send a light signal through the window of the assembly housing.

5. The method of claim 2, wherein classifying the maximum peak in each pulse region comprises:

classifying the maximum peak as the first type of peak if the weighted sum of the pulse region is larger than a positive threshold or smaller than a negative threshold; and classifying the maximum peak as the second type of peak if the weighted sum of the pulse region is between the positive threshold and the negative threshold.

6. The method of claim 5, further comprising:

filtering the histogram using a matched filter (MF) to generate an MF output signal;

finding a strongest MF target in the MF output signal; and generating a list of targets in the histogram by combining the strongest MF target and the list of ZCF targets.

7. The method of claim 6, further comprising:

identifying the strongest MF target as a strongest target in the histogram if an amplitude of the strongest MF target is larger than an amplitude of a strongest ZCF target in the list of ZCF targets, or if the list of ZCF targets is empty.

8. The method of claim 1, wherein generating the list of ZCF targets comprises:

comparing a confidence level of each of the maximum peaks classified as the first type of peak with a confidence threshold; and copying the maximum peaks classified as the first type of peak and with confidence levels higher than the confidence threshold to the list of ZCF targets.

9. The method of claim 1, wherein the ZCF comprises:

a ZCF pulse region, wherein a width of the ZCF pulse region corresponds to a full width at half maximum (FWHM) of a pulse shape of an emitter of the ToF imager;

a pre-pulse region before the ZCF pulse region, wherein first filter coefficients in the pre-pulse region have negative values; and a post-pulse region after the ZCF pulse region, wherein second filter coefficients in the post-pulse region have negative values, wherein a second average of the second filter coefficients is smaller than a first average of the first filter coefficients.

10. The method of claim 9, wherein a sum of the coefficients of the ZCF is a negative value.

11. A method of processing a histogram generated by a time-of-flight (ToF) imager, the method comprising:

assigning a weight coefficient for each histogram bin of the histogram;

generating a ZCF output signal by filtering the histogram using a zero-crossing filter (ZCF);

finding positive pulse regions in the ZCF output signal, wherein each of the positive pulse regions is defined by a pair of zero-crossing points;

computing, for each positive pulse region, a weighted sum by multiplying values of the ZCF output signal with corresponding weight coefficients of the histogram bins to generate weighted values of the ZCF output signal and by adding the weighted values of the ZCF output signal in each positive pulse region;

classifying a maximum peak in each positive pulse region as a first type of peak or a second type of peak based on the weighted sum of the positive pulse region; and creating a list of ZCF targets from the maximum peaks classified as the first type of peaks.

12. The method of claim 11, further comprising:

identifying a strongest ZCF target from the list of ZCF targets;

generating a matched filter (MF) output signal by filtering the histogram with an MF;

identifying a strongest MF target from the MF output signal; and choosing, from the strongest ZCF target and the strongest MF target, a stronger target as a strongest target in the histogram.

13. The method of claim 11, wherein assigning the weight coefficient comprises:

assigning negative values for the weight coefficients of histogram bins located before a pre-determined histogram bin; and assigning positive values for the weight coefficients of histogram bins located after the pre-determined histogram bin.

14. The method of claim 13, wherein the weight coefficients of the histogram bins increase along a direction from a first histogram bin of the histogram toward a last histogram bin of the histogram.

15. The method of claim 13, wherein classifying the maximum peak in each positive pulse region comprises:

classifying the maximum peak as the first type of peak if the weighted sum of the positive pulse region is larger than a first threshold or smaller than a second threshold, wherein the first threshold is larger than the second threshold; and classifying the maximum peak as the second type of peak if the weighted sum of the positive pulse region is between the second threshold and the first threshold.

16. The method of claim 15, wherein the first threshold is a positive value, and the second threshold is a negative value.

17. A time-of-flight (ToF) imager comprising:
- a light source configured to generate a light signal for illuminating an object;
- a single-photon avalanche diode (SPAD) configured to generate a histogram for a reflected light signal from the object;
- a zero-crossing filter (ZCF) configured to generate a ZCF output signal by filtering the histogram;
- a matched filter (MF) configured to generate an MF output signal by filtering the histogram; and
- a peak finding circuit configured to identify a list of targets in the histogram using the ZCF output signal and the MF output signal by:
  - finding positive pulse regions in the ZCF output signal, wherein each of the positive pulse regions is defined by a pair of zero-crossing points;
  - computing, for each positive pulse region, a weighted sum of the ZCF output signal in the positive pulse region;
  - classifying a maximum peak in each positive pulse region as a first type of peak or a second type of peak based on the weighted sum of the positive pulse region;
  - generating a list of ZCF targets based on the maximum peaks classified as the first type of peaks;
  - identifying a strongest MF target from the MF output signal; and
  - generating the list of targets in the histogram using the list of ZCF targets and the strongest MF target.

18. The ToF imager of claim 17, wherein the peak finding circuit is configured to identify a strongest target in the histogram by:
- identifying a stronger one of the strongest MF target and a strongest ZCF target in the list of ZCF targets as the strongest target in the histogram.

19. The ToF imager of claim 17, wherein the peak finding circuit is configured to compute, for each positive pulse region, the weighted sum of the ZCF output signal in the positive pulse region by:
- multiplying values of the ZCF output signal in the positive pulse region with corresponding weight coefficients to generate weighted values of the ZCF output signal; and
- adding up the weighted values of the ZCF output signal in the positive pulse region.

20. The ToF imager of claim 19, wherein the peak finding circuit is configured to classify the maximum peak in each positive pulse region by:
- classifying the maximum peak as the first type of peak if the weighted sum of the positive pulse region is larger than a first threshold or smaller than a second threshold, wherein the first threshold is larger than the second threshold; and
- classifying the maximum peak as the second type of peak if the weighted sum of the positive pulse region is between the second threshold and the first threshold.

* * * * *